(12) United States Patent
De Boer

(10) Patent No.: US 6,695,287 B1
(45) Date of Patent: Feb. 24, 2004

(54) PORTABLE HYDRAULIC VEHICLE LIFT

(76) Inventor: Robert De Boer, 4280 Iowa 9, Little Rock, IA (US) 51243

( * ) Notice: Subject to any disclaimer, the term of this patent is extended or adjusted under 35 U.S.C. 154(b) by 20 days.

(21) Appl. No.: 10/099,014

(22) Filed: Mar. 15, 2002

(51) Int. Cl.⁷ .................................................. B60P 1/48
(52) U.S. Cl. .................................................. 254/10 C
(58) Field of Search .................. 280/47.16, 763.1, 280/764.1, 767; 254/8 R, 8 B, 8 C, 9 R, 9 B, 9 C, 10 R, 10 B, 10 C, 7, 7 B, 7 C, 124, 45, 49, 50

(56) References Cited

U.S. PATENT DOCUMENTS

| | | | |
|---|---|---|---|
| 2,077,265 A | * | 4/1937 | Reed ........................ 254/10 C |
| 2,206,788 A | | 7/1940 | Meacham |
| 2,471,901 A | | 5/1949 | Ross |
| 2,929,519 A | | 3/1960 | Taylor |
| 2,940,769 A | | 6/1960 | Taylor |
| 3,117,765 A | * | 1/1964 | Chiuzzi ..................... 254/10 C |
| 3,319,932 A | | 5/1967 | Szczepanik |
| 4,401,408 A | * | 8/1983 | Gibert ....................... 280/764.1 |
| 4,690,606 A | | 9/1987 | Ross |
| 4,901,980 A | | 2/1990 | Hansen |
| 5,340,082 A | | 8/1994 | Holloway |
| 5,417,540 A | | 5/1995 | Cox |
| 5,947,448 A | | 9/1999 | Lewis et al. |
| 6,102,370 A | | 8/2000 | Johnston |
| 6,164,414 A | | 12/2000 | Duty |
| 6,173,941 B1 | | 1/2001 | Johnston |
| 6,193,219 B1 | | 2/2001 | Belley et al. |
| 6,199,825 B1 | | 3/2001 | Johnson et al. |
| 6,206,346 B1 | | 3/2001 | Johnson et al. |
| 6,286,812 B1 | | 9/2001 | Cherry |

* cited by examiner

*Primary Examiner*—Robert C. Watson (57) ABSTRACT

A portable hydraulic vehicle lift that functions as a vehicle trailer for transporting a vehicle over the road, and that includes a platform, and an elevating system for elevating the platform above the ground. The elevating system comprises a front leg assembly pivotally mounted on the platform that is pivotable between transport and lift positions, and a rear leg assembly pivotally mounted on the platform that is pivotable between transport and lift positions. A moving mechanism moves the front leg assembly between the transport and lift positions. A linking structure links the rear and the front leg assemblies for pivoting the rear leg assembly with the front leg assembly. Ground engaging wheels permit the platform to move over the ground and are mounted on the platform for elevating with the platform when the elevating system raises the platform such that the wheel are lifted from contact with the ground.

26 Claims, 10 Drawing Sheets

FIG. 9

PORTABLE HYDRAULIC VEHICLE LIFT

BACKGROUND OF THE INVENTION

1. Field of the Invention

The present invention relates to vehicle lifts and more particularly pertains to a new portable hydraulic vehicle lift for providing a lift that functions as a trailer for transporting a vehicle over the road.

2. Description of the Prior Art

The use of vehicle lifts is known in the prior art. The known vehicle lifts are for the most part limited to use in a single location, with movement of the lift to a different locations requiring some type of disassembly of the lift, or in some cases requires the mounting of caster wheels to the lift to roll the lift across a short distance. Prior to any movement of the known lifts, the vehicle must be removed from the lift so that the disassembly may be performed or the caster wheels mounted. Thus, the use of such conventional vehicle lifts in relatively remote locations from a traditional vehicle repair garage has been extremely limited, if not non-existent.

It has thus been desired to have a vehicle that is more portable, and is more easily transported, than the known conventional lifts.

SUMMARY OF THE INVENTION

The portable hydraulic vehicle lift according to the present invention substantially departs from the conventional concepts and designs of the prior art, and in so doing provides an apparatus primarily developed for the purpose of providing a lift that is extraordinarily portable over long distances, and that also functions as a trailer for transporting a vehicle over the road.

To attain these benefits, the present invention generally comprises a platform, and an elevating system mounted on the platform for elevating the platform above the ground. The elevating system comprises a front leg assembly pivotally mounted on the platform such that the front leg assembly is pivotable between transport and lift positions, and a rear leg assembly pivotally mounted on the platform such that the rear leg assembly is pivotable between transport and lift positions. A moving mechanism moves the front leg assembly between the transport and lift positions. A linking structure links the rear and the front leg assemblies for pivoting the rear leg assembly with the front leg assembly. Ground engaging wheels permit the platform to move over the ground and are mounted on the platform for elevating with the platform when the elevating system raises the platform such that the wheel are lifted from contact with the ground.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

One advantageous application of the invention is in the transport and maintenance of racing vehicles, both in the shop and at the race facility. Other advantageous applications for the invention include use in oil changing facilities and vehicle service garages to reduce the investment in the building structures and allow more versatile facilities. Another advantageous application of the invention is in the transport and display of vehicles at automobile shows and for promotion on dealer lots. Those skilled in the art will appreciate that a myriad of other possible applications are possible for the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
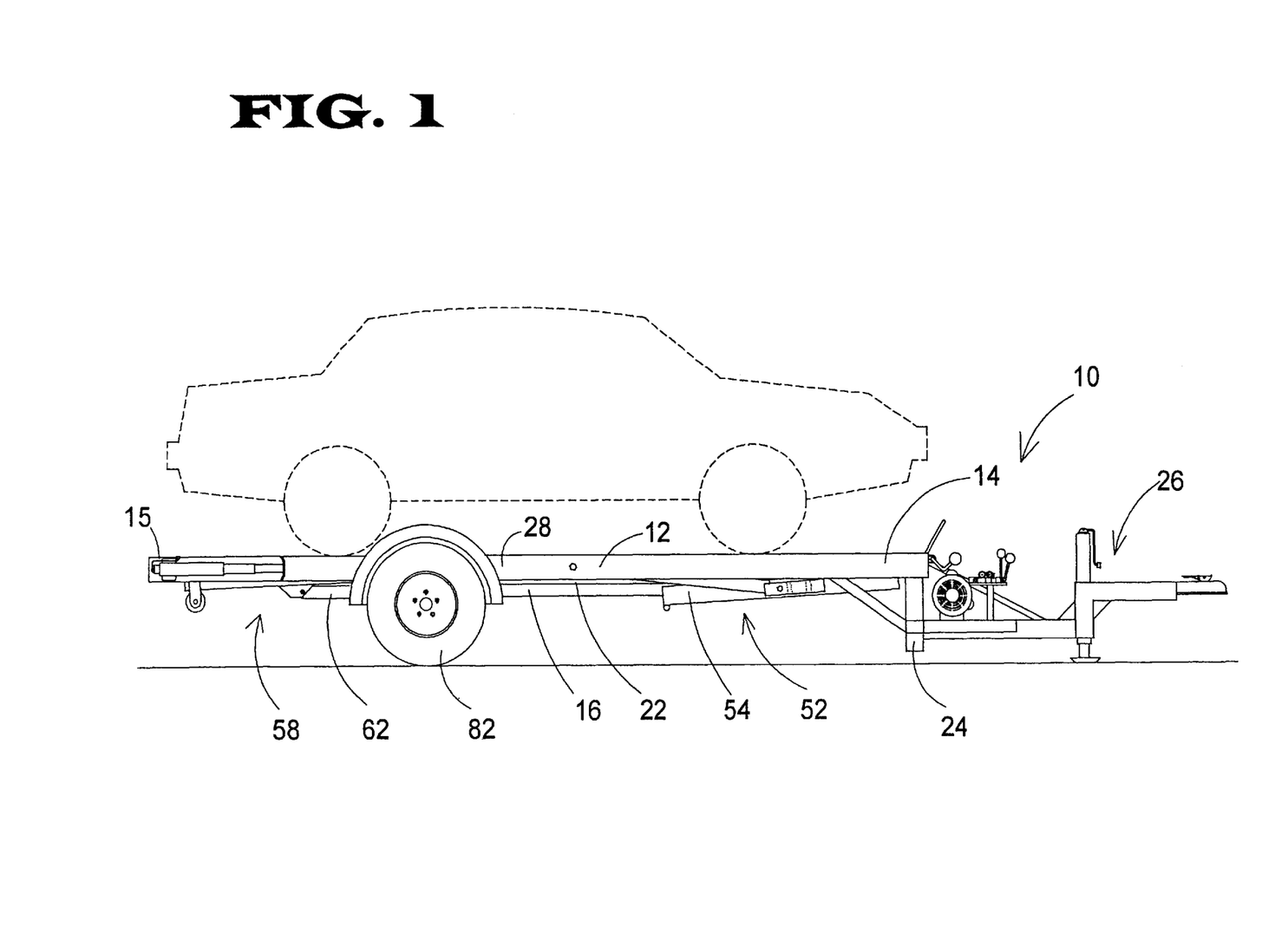
FIG. 1 is a schematic side view of a new portable hydraulic vehicle lift according to the present invention particularly illustrating the leg assemblies shown in their transport positions.
Figure 2:
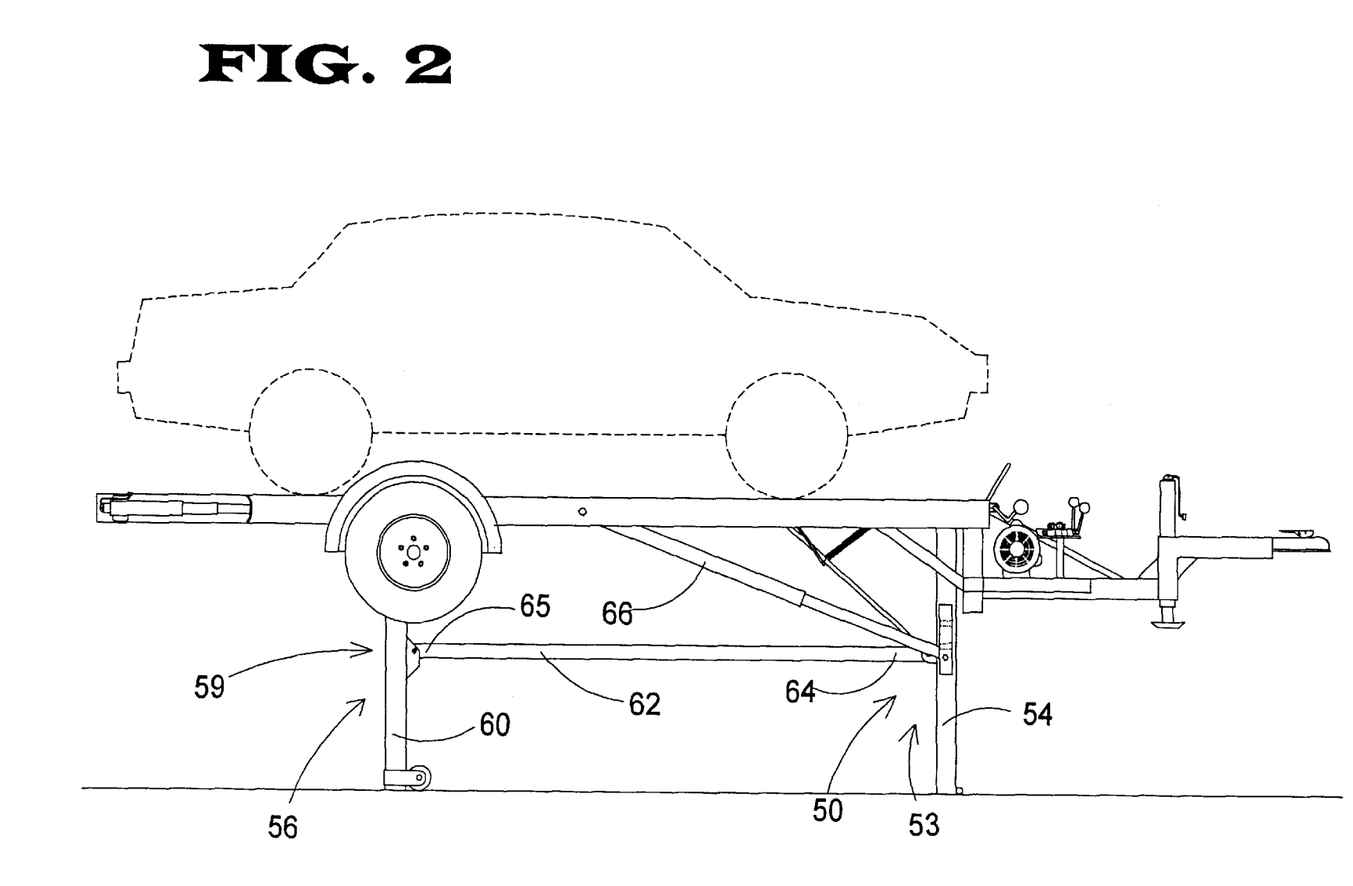
FIG. 2 is a schematic side view of the present invention particularly illustrating the leg assemblies in the lift positions.
Figure 3:
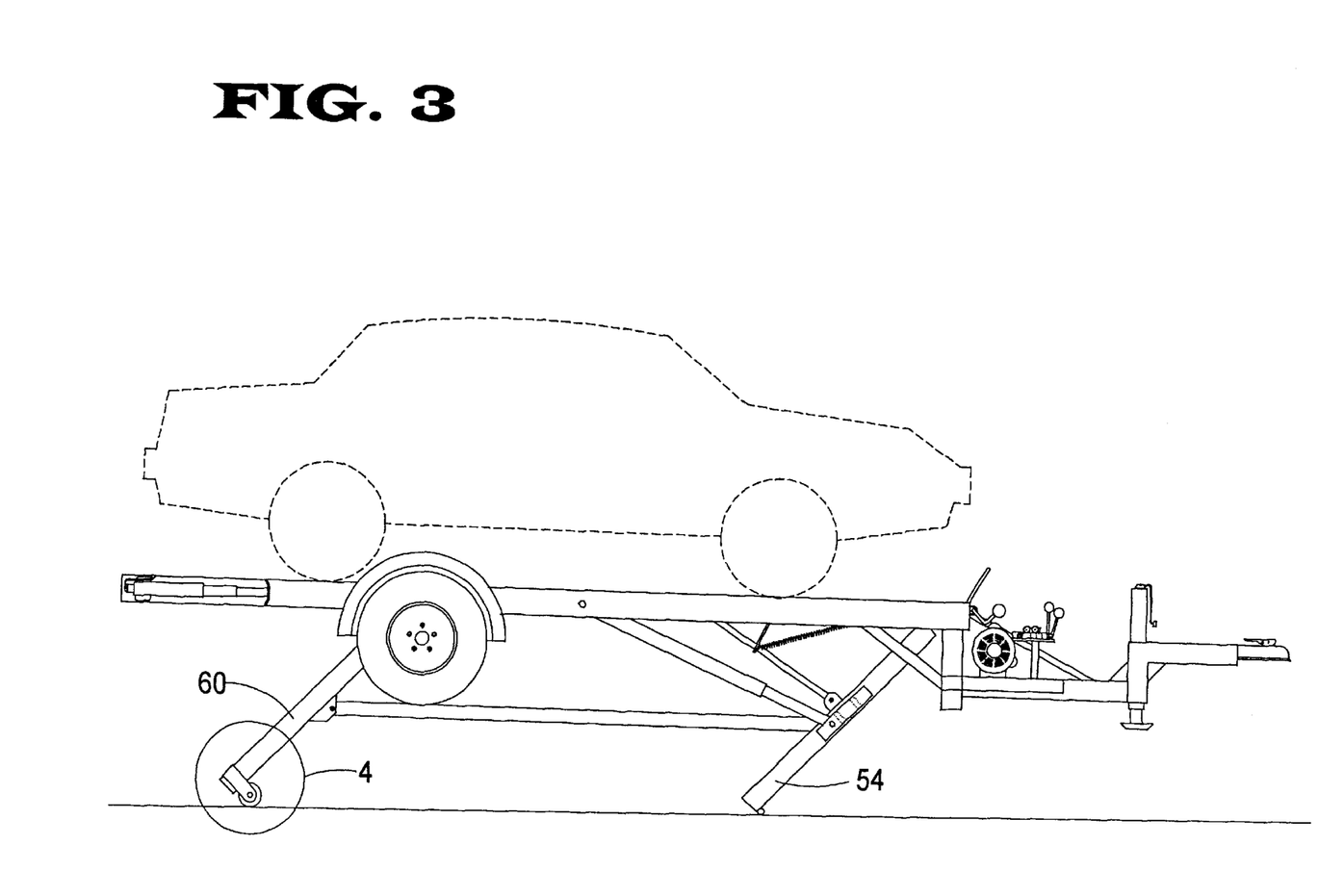
FIG. 3 is a schematic side view of the present invention particularly illustrating the leg assemblies at a position between the transport and lift positions.
Figure 4:
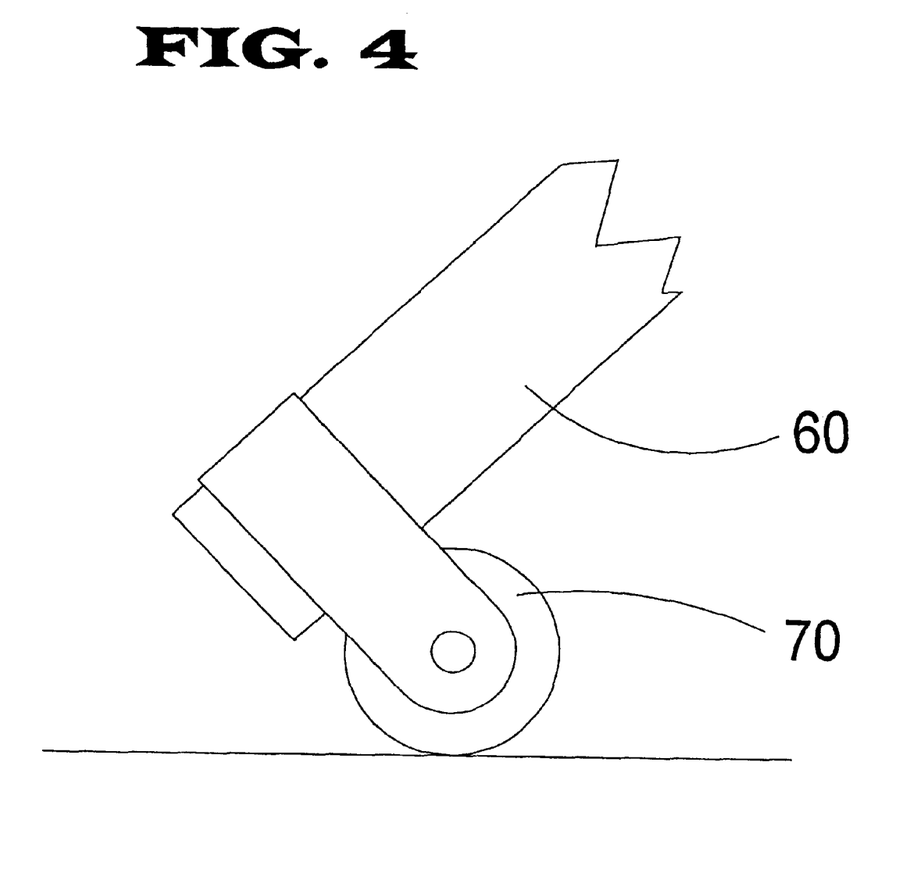
FIG. 4 is a schematic enlarged view of the portion of the apparatus shown in the circle marked "4" in FIG. 3.
Figure 5:
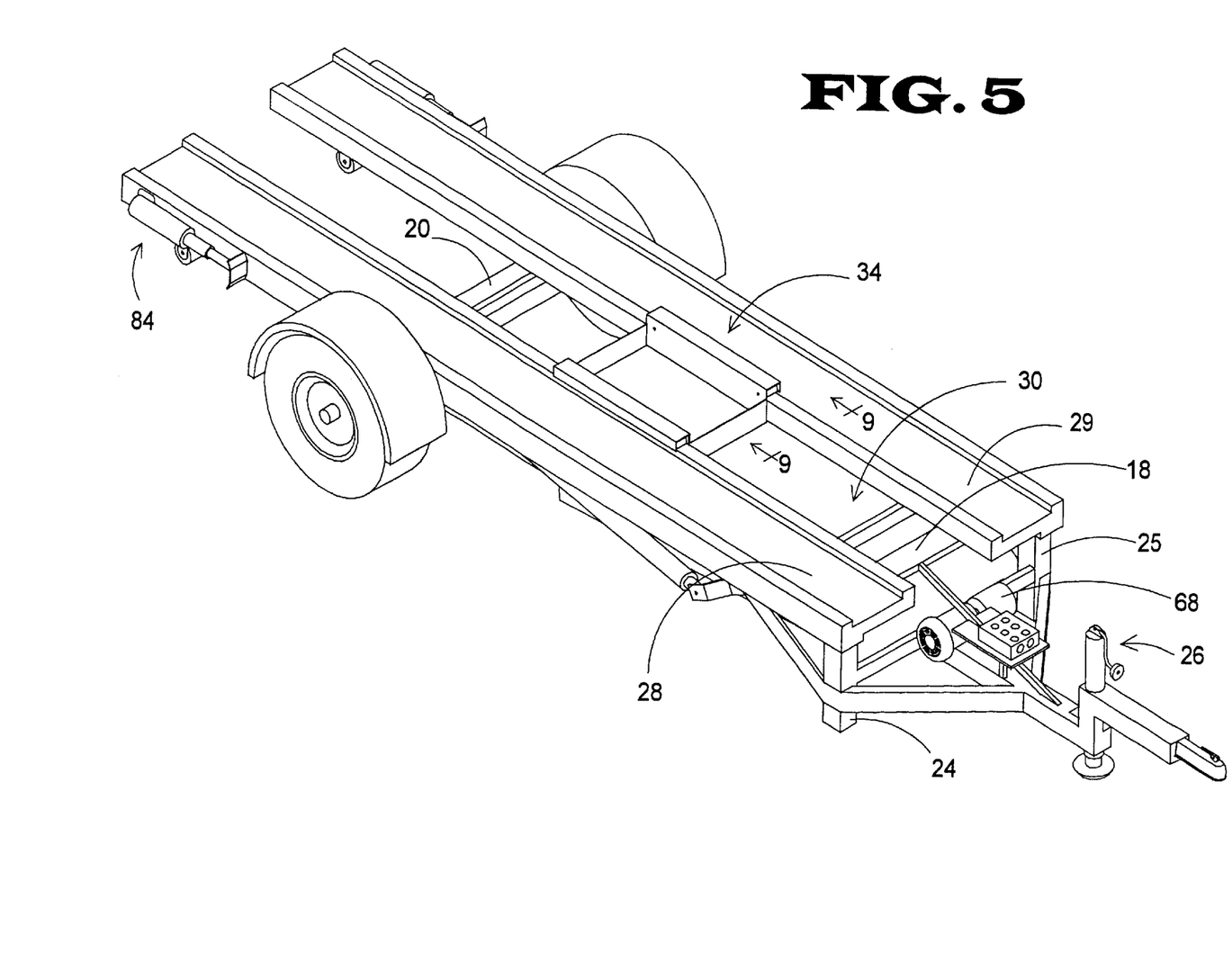
FIG. 5 is a schematic perspective view of the present invention.
Figure 6:
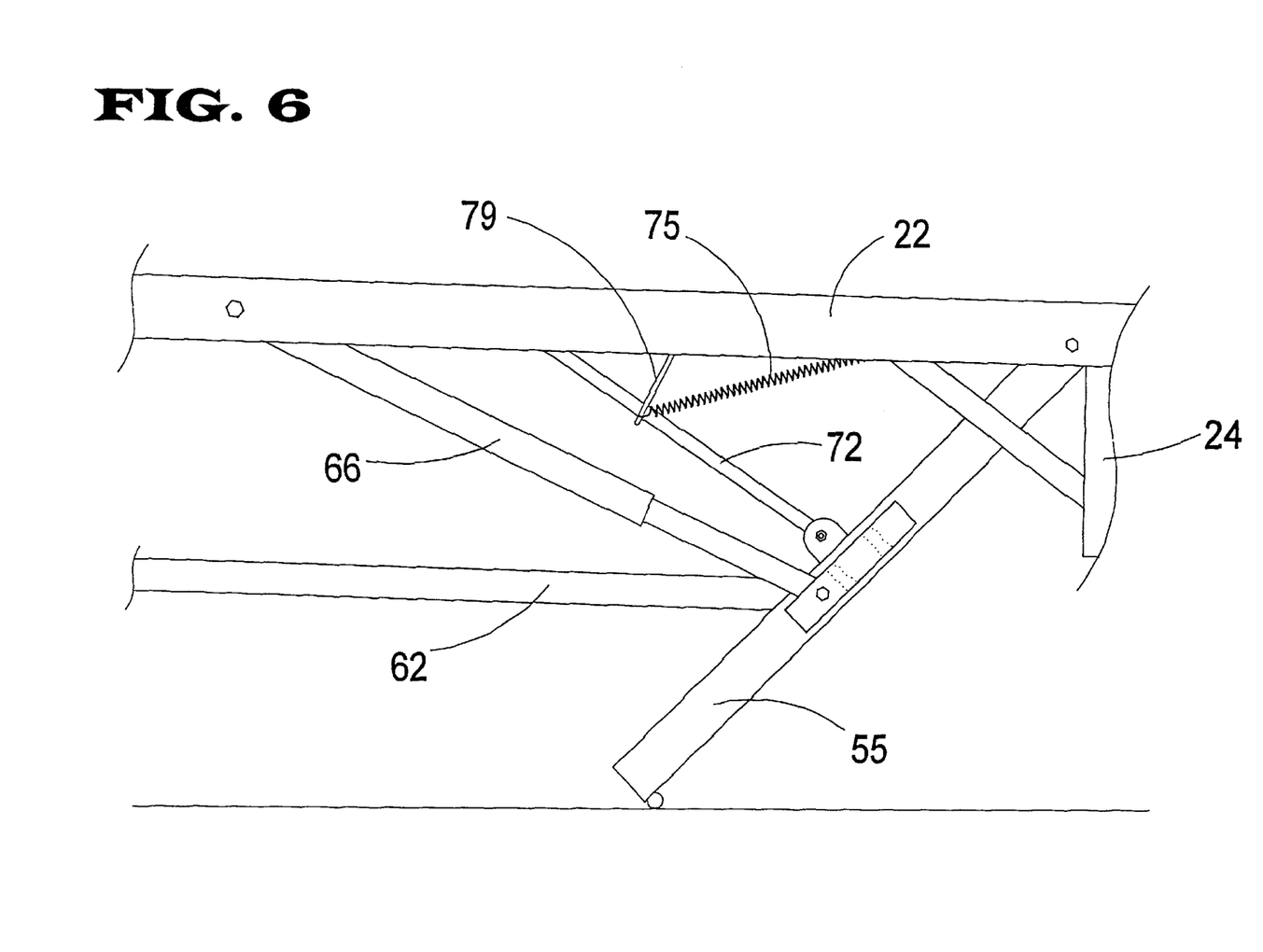
FIG. 6 is a schematic side view of the present invention particularly illustrating the moving structure and the securing structure.
Figure 7:
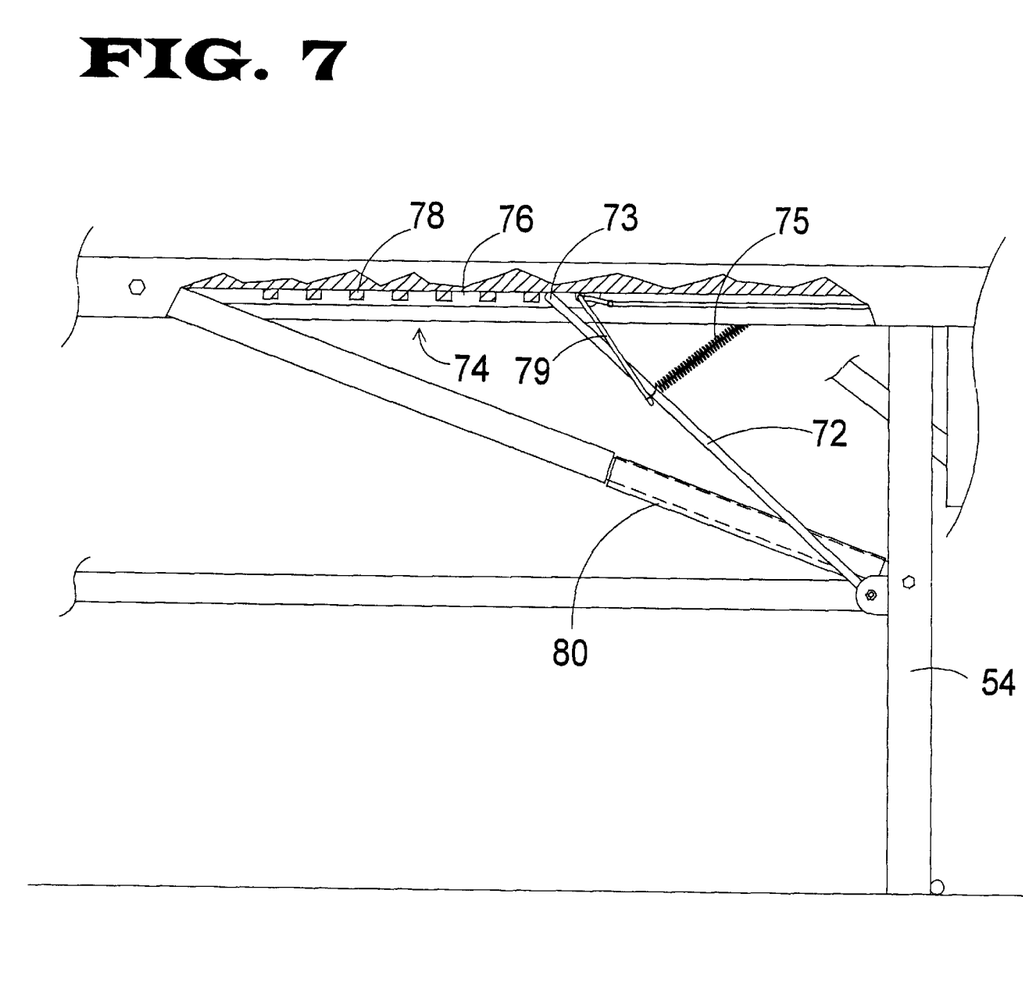
FIG. 7 is a schematic side view of a portion of the platform of the present invention particularly illustrating the securing structure.
Figure 8:
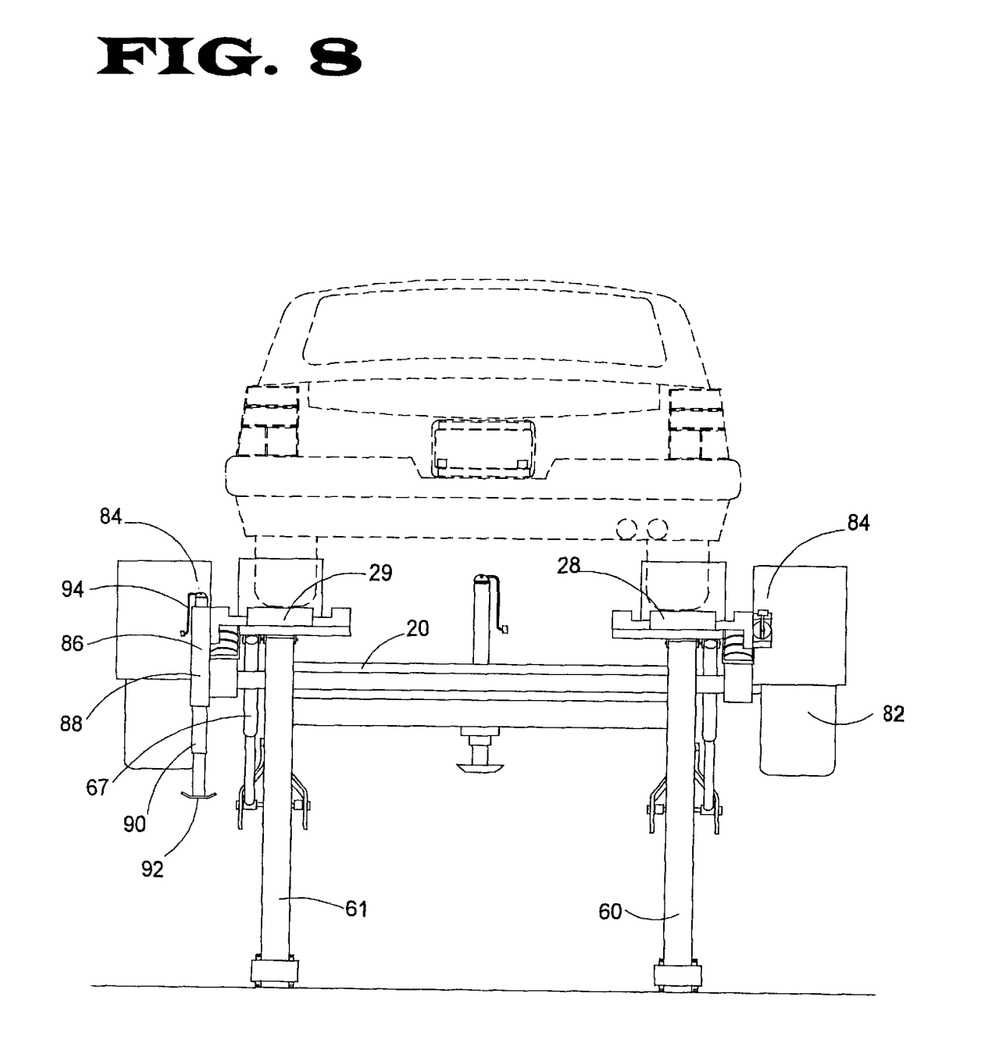
FIG. 8 is a schematic rear end view of the present invention.
Figure 9:
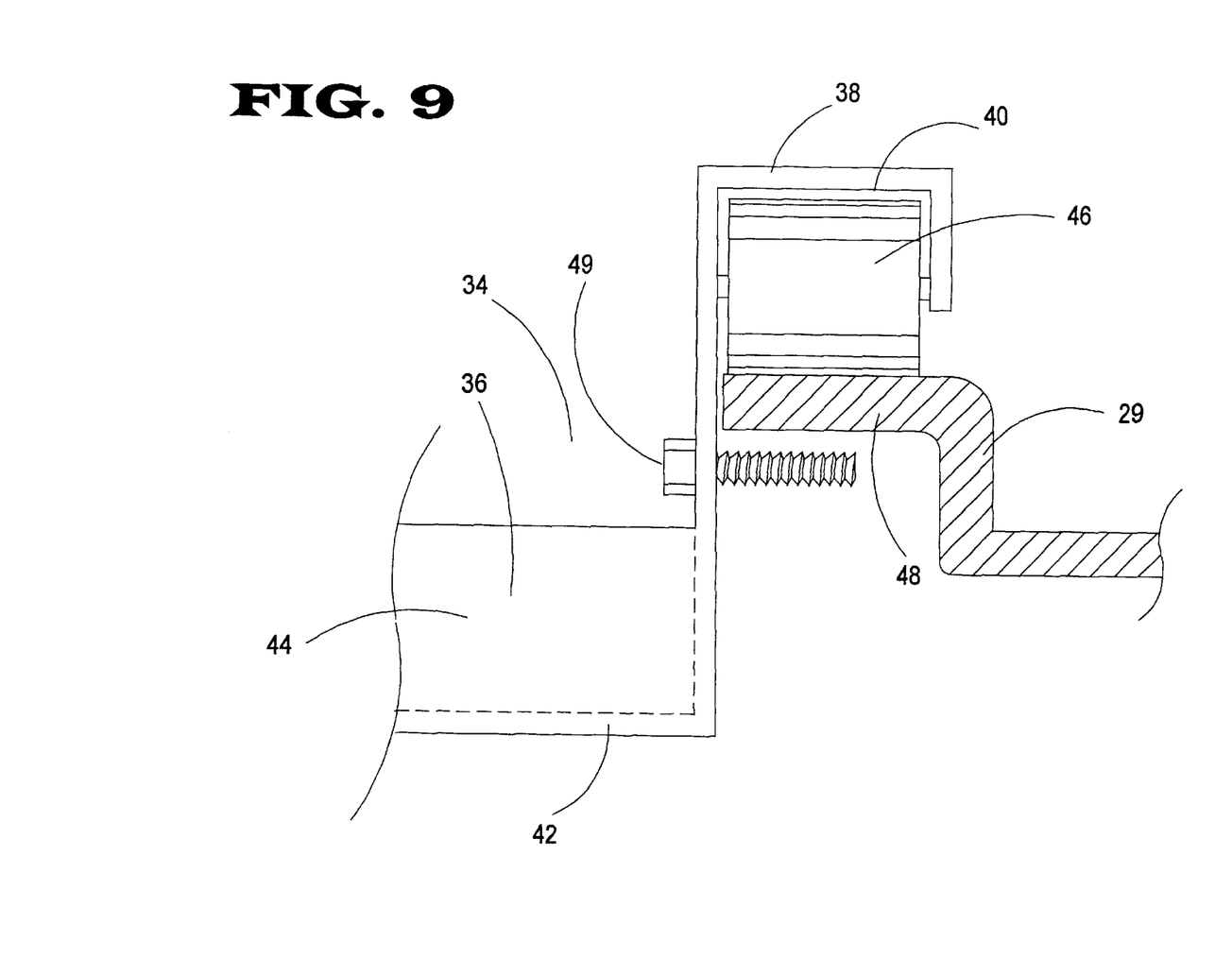
FIG. 9 is a partial sectional view of the present invention taken along line 9—9 of FIG. 5.
Figure 10:
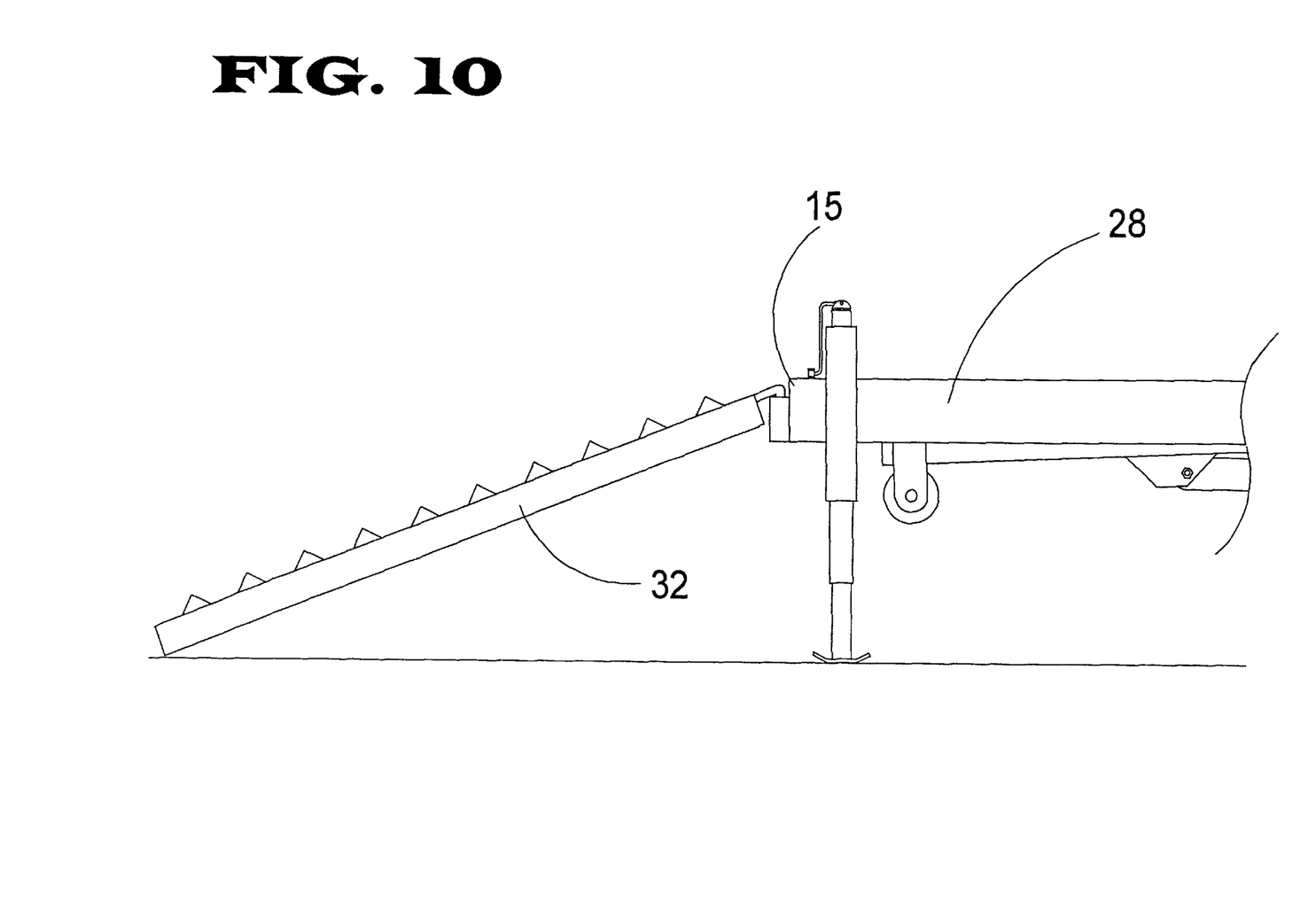
FIG. 10 is a side view of a rear portion of the present invention showing a channel extension ramp and a platform stabilization assembly.

With reference now to the drawings, and in particular to FIGS. 1 through 10 thereof, a new portable hydraulic vehicle lift embodying the principles and concepts of the present invention and generally designated by the reference numeral 10 will be described.

The portable lifting apparatus 10 of the invention includes a platform 12 that has a front 14 and a rear 15. The platform may include a support frame 16 having a front member 18 and a rear member 20, and laterally spaced side members 22. The platform may also include a pair of stationary legs 24, 25 that depending or extend downwardly from a forward location on the support frame 16 for supporting the front of the apparatus when the apparatus is not connected to a towing vehicle. The stationary legs 24, 25 may be laterally spaced from each other and each stationary leg may be mounted on the support frame near the juncture of the front member 18 and each of the side members 22. Optionally, to maximize the ground clearance of the apparatus, the stationary legs 24, 25 may be retractable upwardly, or may be selectively pivotable upwardly. The platform 12 may also include a tongue assembly 26 for removably attaching to a towing vehicle for towing the apparatus over the road. The tongue assembly 26 extends forwardly from front member 18 of the support frame, and may support various operating components of the apparatus. Optionally, the tongue assembly may be removable from the rest of the apparatus, although the easy and quick portability of the apparatus may be adversely affected.

The platform may also include a pair of channels 28, 29 for supporting the wheels of a vehicle to be lifted or elevated or moved down the road when the apparatus 10 is being used as a trailer. The channels 28, 29 may be mounted on the support frame 16 and may be laterally spaced from each other to form a central space 30 therebetween to form tracks on which a vehicle may be driven. The channels 28, 29 may extend from the rear 15 of the platform 10 toward the front 14 of the platform, and the vehicle may be loaded onto the apparatus using removable channel extension ramps 32 that each have a first end mounted on the rear ends of the channels and a second end that is restable on a ground surface. Significantly, the central space may be uninterrupted by any obstruction of the apparatus between the front member 18 and the rear member 20 of the support frame 16. This facilitates movement of a person in the central space along the underside of a vehicle resting on the channels, and avoids the person having duck or crawl under a multiplicity of cross members that would impede the person's movement underneath the supported vehicle. In one embodiment of the invention, the central space 30 extends approximately 108 inches (approximately 275 centimeters) from front to rear. Illustratively, the channels may be approximately 18 feet (approximately 550 centimeters), although other lengths may be suitable employed.

A support tray assembly 34 may optionally be provided on the apparatus, and may be extended between the pair of channels 28, 29 and across the central space 30 between the channels. The support tray may be employed for supporting tools, vehicle jacks, fluid drip pans, and the like. The support tray assembly may be movable along the central space and towards the front 14 of the platform and toward the rear 15 of the platform. One embodiment of the support tray assembly includes a support tray 36 having opposite ends, with each of the ends having a support member 38 defining an inverted groove 40. The support tray 36 has a bottom wall 42 and a pair of side walls 44 extending upwardly from the bottom wall to define a well for the support tray. The support member 38 may form an end wall of the support tray. The support tray assembly may also include a roller 46 mounted on each of the ends of the support tray for resting on one of the channels. The roller 46 may be mounted in the inverted groove 40 of one of the support members on one of the ends of the support tray. Optionally, a pair of the rollers 46 may be mounted on each support member 38. Each of the channels may be provided with a raised lip 48 extending inwardly into the central space, and the roller 46 may roll on an upper surface of the lip 48. A fastener 49 extending through the support member 38 may extend under a portion of the lip 38 such that the lip of the channel is trapped between the roller and the fastener to secure the support tray assembly to the channels.

The invention further includes an elevating system that is mounted on the platform for elevating the platform above a ground surface along with any vehicle that is positioned on the platform. The elevating system may include a front leg assembly 50 pivotally mounted on the platform 12 such that the front leg assembly may pivot with respect to the platform. Significantly, the front leg assembly 50 may be pivotable between a transport position 52 and a lift position 53. The transport position 52 is generally the position of the front leg assembly 50 when the apparatus is being transported from one location to another, regardless of whether a vehicle is rested on the platform. The lift position 53 is generally the position of the front leg assembly 50 when the apparatus is at the position of maximum elevation or lift. The front leg assembly 50 may be mounted on the support frame of the platform toward the front 14 thereof. The front leg assembly 50 may include a pair of laterally spaced front legs 54 that are pivotally mounted on the platform. The transport position 52 of the front leg assembly may further be characterized by the front legs being oriented substantially parallel to the platform and the lift position may be further characterized by the front legs extending downwardly in a substantially perpendicular orientation with respect to the platform.

The elevating system may also include a rear leg assembly 56 pivotally mounted on the platform for pivoting such that the rear leg assembly may pivot with respect to the platform. The rear leg assembly 56 may also be pivotable between transport 58 and lift 59 positions of similar character to the positions of the front leg assembly 50. The rear leg assembly 56 may include a pair of laterally spaced rear legs 60, 61 that are pivotally mounted on the platform 12. The transport position 58 of the rear leg assembly 56 may be characterized by the rear legs being oriented substantially parallel to the platform 12 and the lift position 59 may be characterized by the rear legs extending downwardly in a substantially perpendicular orientation with respect to the platform. Optionally, the front and rear legs may each comprise two telescoping portions that are manually or automatically extendable for maximizing the platform height in the lift position of the leg assemblies, although it should be noted that platform heights of 48 inches or more have been achieved with an embodiment of the invention having legs with fixed lengths.

The elevating system may include a linking structure that links the rear leg assembly 56 to the front leg assembly 50 for pivoting the rear leg assembly with the front leg assembly, which permits the rear leg assembly to be moved simultaneously with the (although not necessarily exactly following) front leg assembly. By the use of the linking structure, only the front leg assembly 50 needs to be acted upon by a moving structure described in greater detail below, with the movement of the front leg assembly to be transferred to the rear leg assembly. One embodiment of the linking structure includes a pair of linking members 62. Each of the linking members 62 may extend between one of the front legs 54 and one of the rear legs 60, 61, with each of the linking members having a forward end 64 mounted on one of the front legs and a rearward end 65 mounted on one of the rear legs. The linking members 62 may be laterally spaced from each other such that the area below the central space 30 is free from the linking members.

The elevating system may also include a moving or actuating structure for moving the front leg assembly 50 between the transport 52 and lift 53. Through the operation of the linking members 62 of the lifting structure, the rear leg assembly is also moved between the transport 58 and lift 59 positions by the moving structure. One embodiment of the moving structure employs a pair of telescopic hydraulic actuators 66, 67, with each of the hydraulic actuators extending between the platform 12 and one of the front legs 54 for pivoting the front leg with respect to the platform. The moving structure may also include a hydraulic pump 68 for supplying pressurized hydraulic fluid to the pair of telescopic hydraulic actuators. The hydraulic pump 68, as well as the controls for controlling the flow of hydraulic fluid between the pump and the actuators 66, 67, may be mounted on the tongue assembly 26 for convenient actuation of the hydraulic system. The controls may include valves for controlling the direction of hydraulic fluid flow, and may also include a shut off valve for completely disconnecting fluid flow for safety reasons, such as when a person is working underneath a vehicle resting on the elevated platform.

A significant feature of the elevating system is a roller 70 mounted each of the rear legs 60, 61 toward a bottom end of the rear leg. The roller 70 is preferably mounted on the rear leg in a manner such that the rear leg 60, 61 does not rest on the roller 70 when the rear leg assembly 56 is in the lift position 59, but on the bottom end of the rear leg, and this occurs without any removal of the roller from the rear leg. Thus, the rear leg is prevented from moving on the roller 70 when the rear leg assembly is fully in the lift position. The rear leg 60, 61 may roll on the roller as the rear leg assembly moves toward the lift position 59 from the transport position 58 until the rear leg assembly reaches the lift position and the rear leg rests on the bottom end of the leg. In one highly preferred embodiment of the invention, the positioning and presence of the roller 70 causes the rear 15 of the platform to raise slightly as the rear leg assembly moves from the lift position toward the transport position. Since the rear of the platform must actually be slightly raised for the rear leg assembly to move from the lift position toward the transport position, the rear leg assembly resists such movement unless the power of the moving structure is applied to the rear leg assembly through the linking structure. This provides a measure of safety so that the rear leg assembly does not easily and without assistance move out of the lilt position toward the transport position and thus possibly bringing the platform and the vehicle down on a person underneath the vehicle. Each roller 70 may be mounted on the rear leg such that it is rotatable about an axis extending perpendicular to a longitudinal axis of the rear leg. A pair of mounting ears may be employed to mount each roller 70 on one of the rear legs, and each of the mounting ears may extend substantially perpendicular to a longitudinal axis of the rear leg.

The roller 70 on the apparatus permits the rear leg assembly 56 to move at a different, or at least not identical, angle with respect to the platform as the front leg assembly 50. The bottom ends of the rear legs are thus prevented from dragging on the ground surface.

In one preferred embodiment of the invention, a securing structure is provided on the apparatus 10 for securing the front leg assembly in a number of intermediate positions between the transport position and the lift position, and resisting movement of the front leg assembly back toward the transport position as the front leg assembly moves toward the lift position. The securing structure thus provides a means for locking the position of the front leg assembly should the moving system fail as the front leg assembly moves between the transport and lift positions and the platform is raised. One embodiment of the securing structure includes a securing member 72 that is pivotally mounted on each of the front legs. Each securing member 72 extends generally rearwardly from one of the front legs and generally upwardly toward a bottom of the platform 12. The securing member 72 has a free end 73 that is positioned adjacent to the bottom of the platform. The securing structure may also include a securing ladder 74 mounted on the bottom of the platform. The securing ladder 74 may have a pair of laterally spaced rail members 76 and a plurality of rung members 78 that extend between the rail members. The rung members 78 form a plurality of stops, and define a plurality of spaces therebetween for receiving the free end 73 of the securing member 72. The securing ladder 74 extends generally in a direction extending between the front 14 and rear 15 of the platform 12. The securing structure may also include a biasing assembly for biasing the securing member 72 in an upward direction toward the bottom of the platform 12 and the free end 73 of the securing member into engagement with the securing ladder 74. The biasing assembly may include a biasing bar 79 pivotally mounted on the bottom of the platform, and a spring 75 extending between the biasing bar and the platform for pressing the biasing bar against the securing member to push the securing member in an upward direction toward the platform. The securing structure may also include a release structure for moving the biasing assembly out of contact with the securing member so that the free end of the securing member drops out of engagement with the securing ladder by the effect of gravity.

A further safety measure includes the use of a cowling 80 that is positionable over the rod of the hydraulic actuator between the mounting of the rod on the front leg and the cylinder of the hydraulic actuator to resist retraction of the rod into the cylinder while the cowl is in place on the rod. However, the cowling safety measure is basically redundant since the rollers 70 provide significant resistance to the leg assemblies moving from the lift to the transport positions, and the hydraulic actuators of the moving structure in the most preferred embodiment do not supporting any of the platform or vehicle weight when the leg assemblies are fully in the lift position.

The apparatus 10 also includes ground engaging means for engaging the ground surface in a manner permitting the platform to move over the ground surface and preferably to be moved over the road at traffic speeds. The ground engaging means may include ground engaging wheels that are mounted on the platform for elevating with the platform when the elevating system raises the platform, and such that the ground engaging means are lifted from contact with the ground surface when the lea assemblies are moved from the transport position to the lift position, and are brought back into contact with the ground surface when the leg assemblies are moved back toward the transport position. The ground engaging wheels may comprise a pair of laterally spaced wheels 82 mounted on the platform. Optionally, a pair of wheels (e.g., on tandem axles) may be provided on each lateral side of the platform for maximizing load-carrying capabilities and highway towing stability.

The apparatus may further include platform stabilization assemblies 84 for stabilizing the platform 12 with respect to the ground surface when loading a vehicle onto the platform. The platform stabilization assemblies 84 may be mounted on the platform toward the rear of the platform and may being selectively abuttable against the ground surface for resisting downward movement of the rear of the platform. The platform stabilization assemblies 84 may comprise a jack assembly 86 being mounted on the rear 15 of the platform, and a jack assembly may be mounted at the rearward end of each of the channels. Each jack assembly 86 may comprise an upper portion 88 mounted on the platform, and a lower portion 90 telescopically mounted on the upper portion 88 and depending downwardly from the platform 12. The lower portion 90 may be extendable from the upper portion 88 to engage the ground surface. Each jack assembly may include a foot member 92 that is mounted on a lower end of the lower portion 86 for resting on the ground surface. Each jack assembly may also include a crank 94 for moving the lower portion with respect to the upper portion. Optionally, other types of stabilization assemblies may be employed that selectively maintain the rear of the platform, and the rear ends of the channel, at a fixed distance from the ground surface as a vehicle is rolled onto and rolled off of the platform. Optionally, the jack assembly may be pivotable from a substantially vertical orientation to a substantially horizontal orientation for increasing ground clearance during transport of the trailer. As a further, option, the jack assembly may be removable altogether from the rear ends of the channel during periods of non-use.

One highly significant aspect of the elevating system is the ability of the system to lift or raise or elevate the vehicle on the platform without requiring any significant set up process or reconfiguration of the apparatus after the apparatus has been used as a trailer. As a result, a vehicle resting on the platform may be moved to a location using the apparatus and the vehicle may then be elevated with respect to the ground surface simply by activating the elevating system and without reconfiguring wheels, rollers or other elements of the apparatus.

In use, a vehicle is loaded onto the platform such as by driving the vehicle onto the channels using the channel extension ramps. Once the vehicle is loaded onto the platform, the apparatus may be pulled by towing vehicle so that the apparatus and the vehicle are transported to a different location. The unique design of the apparatus permits the apparatus to operate much the same as any vehicle trailer than can be pulled at highway speeds to transport a vehicle over hundreds of miles. Once the vehicle has been loaded onto the platform, the apparatus may also be used as a vehicle lift to permit a person to work on the underside of the vehicle, or the lift may merely raise the vehicle to a level where tires may be removed from and replaced on the vehicle at chest height. Thus, it is possible for the user to load a vehicle onto the apparatus, tow the apparatus to a destination, and then raise the platform to work on the vehicle. This apparatus is therefore especially useful for transporting race cars and for performing pre-race and post-race work on the race car, and even permits major repairs to be more easily performed in the pits of even the most primitive racing facilities.

Other optional features may be employed on the apparatus, including means for securing the vehicle to the platform, such as chock blocks and tie downs. Further, an electrical system may be provided for powering the hydraulic pump, lights for illuminating portions of a vehicle on the platform, and receptacles mounted on the platform for plugging in power tools that may be employed during work on the vehicle positioned on the platform. Also, additionally hydraulic outlets may be provided along with valves controlling the outlets. Platform extensions may be provided to extend the platform 12, and some type of enclosure or overhead covering may be mountable on the platform.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable lifting apparatus comprising:

a platform having a front and rear;

an elevating system mounted on the platform for elevating the platform above a ground surface with any vehicle positioned on the platform, the elevating system comprising:

a front leg assembly pivotally mounted on the platform for pivoting with respect to the platform such that the front leg assembly is pivotable between a transport position and a lift position;

a rear leg assembly pivotally mounted on the platform for pivoting with respect to the platform such that the rear leg assembly is pivotable between a transport position and a lift position;

a linking structure linking the rear leg assembly to the front leg assembly for pivoting the rear leg assembly with the front leg assembly; and moving means for moving the front leg assembly between the transport and lift positions;

ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface; and wherein the platform includes means for removably attaching the platform to a towing vehicle to enable towing of the platform over the ground surface on the ground engaging means.

2. The apparatus of claim 1 wherein the rear leg assembly includes a pair of rear legs, and the elevating system includes a roller mounted on each of the rear legs toward a bottom end of the rear leg, the roller being mounted on the rear leg in a manner such that the rear leg does not rest on the roller when the rear leg assembly is in the lift position, and the rear leg rolls on the roller as the rear leg assembly moves toward the lift position from the transport position.

3. The apparatus of claim 2 wherein the roller causes the rear of the platform to raise as the rear leg assembly moves from the lift position toward the transport position.

4. The apparatus of claim 1 wherein the ground engaging means comprises a pair of laterally spaced wheels mounted on the platform.

5. The apparatus of claim 1 wherein the front leg assembly includes a pair of laterally spaced front legs pivotally mounted on the platform toward the front thereof, and the rear leg assembly includes a pair of laterally spaced rear legs pivotally mounted on the platform toward a rear end thereof.

6. The apparatus of claim 5 wherein the transport position of the front leg assembly is characterized by the front legs being oriented substantially parallel to the platform and the lift position is characterized by the front legs extending downwardly in a substantially perpendicular orientation with respect to the platform, and the transport position of the rear leg assembly being characterized by the rear legs being oriented substantially parallel to the platform and the lift position being characterized by the rear legs extending downwardly in a substantially perpendicular orientation with respect to the platform.

7. The apparatus of claim 5 wherein the linking structure including a pair of linking members, each of the linking members extending between one of the front legs and one of the rear legs.

8. The apparatus of claim 1 wherein the platform comprises a pair of channels for supporting wheels of a vehicle, the pair of channels extending between the front and rear of the platform and being laterally spaced to form a central space therebetween.

9. The apparatus of claim 1 additionally comprising a securing means for securing the front leg assembly in positions between the transport position and the lift position and resisting movement of the front leg assembly toward the transport position.

10. The apparatus of claim 9 wherein the securing means comprises:
 a securing member pivotally mounted on each of the front legs, each securing member extending rearwardly from one of the front legs and upwardly toward a bottom of the platform, the securing member having a free end being positionable adjacent to the bottom of the platform;
 a securing ladder mounted on the bottom of the platform, the securing ladder having a pair of laterally spaced rail members and a plurality of rung members extending between the rail members, the rung members defining spaces therebetween for receiving the free end of the securing member;
 biasing means for biasing the securing member upwardly toward the bottom of the platform and the free end of the securing member into engagement with the securing ladder; and
 a release structure for releasing the biasing means from acting on the securing member to move the free end of the securing member out of engagement with the securing ladder.

11. The apparatus of claim 1 wherein the moving means comprises a pair of telescopic hydraulic actuators, each of the hydraulic actuators extending between the platform and the front leg assembly for pivoting the front leg assembly with respect to the platform.

12. The apparatus of claim 8 additionally comprising a support tray assembly extending between the pair of channels across the central space between the channels, the support tray assembly being movable towards the front of the platform and toward the rear of the platform.

13. The apparatus of claim 1 additionally comprising platform stabilization means for stabilizing the platform with respect to the ground surface when loading a vehicle onto the platform, the platform stabilization means being mounted on the platform toward the rear of the platform and being selectively abuttable against the ground surface for resisting downward movement of the rear of the platform.

14. A portable lifting apparatus comprising:
 a platform having a front and rear;
 an elevating system mounted on the platform for elevating the platform above a ground surface with any vehicle positioned on the platform, the elevating system comprising:
  a front leg assembly pivotally mounted on the platform for pivoting with respect to the platform such that the front leg assembly is pivotable between a transport position and a lift position; and
  a rear leg assembly pivotally mounted on the platform for pivoting with respect to the platform such that the rear leg assembly is pivotable between a transport position and a lift position, the rear leg assembly including a pair of rear legs, and the elevating system includes a roller mounted on each of the rear legs toward a bottom end of the rear leg, and the rear leg rolls on the roller as the rear leg assembly moves toward the lift position from the transport position;
  wherein the roller is mounted on the rear leg in a manner such that the rear leg does not rest on the roller when the rear leg assembly is in the lift position.

15. The apparatus of claim 14 wherein the roller causes the rear of the platform to raise as the rear leg assembly moves from the lift position toward the transport position.

16. The apparatus of claim 14 additionally comprising ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface.

17. The apparatus of claim 14 wherein the front leg assembly includes a pair of laterally spaced front legs pivotally mounted on the platform toward the front thereof, and the rear leg assembly includes a pair of laterally spaced rear legs pivotally mounted on the platform toward a rear end thereof, wherein the transport position of the front leg assembly is characterized by the front legs being oriented substantially parallel to the platform and the lift position is characterized by the front legs extending downwardly in a substantially perpendicular orientation with respect to the platform, and wherein the transport position of the rear leg assembly is characterized by the rear legs being oriented substantially parallel to the platform and the lift position being characterized by the rear legs extending downwardly in a substantially perpendicular orientation with respect to the platform.

18. The apparatus of claim 14 wherein the elevating system includes a linking structure linking the rear leg assembly to the front leg assembly for pivoting the rear leg assembly with the front leg assembly.

19. A portable lifting apparatus comprising:
 a platform having a front and rear;
 an elevating system mounted on the platform for elevating the platform above a ground surface with any vehicle positioned on the platform, the elevating system comprising:
  a front leg assembly pivotally mounted on the platform for pivoting with respect to the platform such that the front leg assembly is pivotable between a transport position and a lift position;
  a rear leg assembly pivotally mounted on the platform for pivoting with respect to the platform such that the rear leg assembly is pivotable between a transport position and a lift position;

a linking structure linking the rear leg assembly to the front leg assembly for pivoting the rear leg assembly with the front leg assembly; and moving means for moving the front leg assembly between the transport and lift positions;

ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface;

wherein the rear leg assembly includes a pair of rear legs, and the elevating system includes a roller mounted on each of the rear legs toward a bottom end of the rear leg, the roller being mounted on the rear leg in a manner such that the rear leg does not rest on the roller when the rear leg assembly is in the lift position, and the rear leg rolls on the roller as the rear leg assembly moves toward the lift position from the transport position;

wherein the roller causes the rear of the platform to raise as the rear leg assembly moves from the lift position toward the transport position;

wherein the ground engaging means comprises a pair of laterally spaced wheels mounted on the platform;

wherein the front leg assembly includes a pair of laterally spaced front legs pivotally mounted on the platform toward the front thereof, and the rear legs are pivotally mounted on the platform toward a rear end thereof;

wherein the transport position of the front leg assembly is characterized by the front legs being oriented substantially parallel to the platform and the lift position is characterized by the front legs extending downwardly in a substantially perpendicular orientation with respect to the platform, and the transport position of the rear leg assembly being characterized by the rear legs being oriented substantially parallel to the platform and the lift position being characterized by the rear legs extending downwardly in a substantially perpendicular orientation with respect to the platform;

wherein the linking structure including a pair of linking members, each of the linking members extending between one of the front legs and one of the rear legs;

wherein the platform comprises a pair of channels for supporting wheels of a vehicle, the pair of channels extending between the front and rear of the platform and being laterally spaced to form a central space therebetween;

securing means for securing the front leg assembly in positions between the transport position and the lift position and resisting movement of the front leg assembly toward the transport position;

wherein the securing means comprises:
a securing member pivotally mounted on each of the front legs, each securing member extending rearwardly from one of the front legs and upwardly toward a bottom of the platform, the securing member having a free end being positionable adjacent to the bottom of the platform;
a securing ladder mounted on the bottom of the platform, the securing ladder having a pair of laterally spaced rail members and a plurality of rung members extending between the rail members, the rung members defining spaces therebetween for receiving the free end of the securing member;
biasing means for biasing the securing member upwardly toward the bottom of the platform and the free end of the securing member into engagement with the securing ladder; and
a release structure for releasing the biasing means from acting on the securing member to move the free end of the securing member out of engagement with the securing ladder;

wherein the moving means comprises a pair of telescopic hydraulic actuators, each of the hydraulic actuators extending between the platform and the front leg assembly for pivoting the front leg assembly with respect to the platform;

a support tray assembly extending between the pair of channels across the central space between the channels, the support tray assembly being movable towards the front of the platform and toward the rear of the platform; and platform stabilization means for stabilizing the platform with respect to the ground surface when loading a vehicle onto the platform, the platform stabilization means being mounted on the platform toward the rear of the platform and being selectively abuttable against the ground surface for resisting downward movement of the rear of the platform.

20. A portable lifting apparatus comprising:

a platform having a front and rear;

an elevating system mounted on the platform for elevating the platform above a ground surface with any vehicle positioned on the platform, the elevating system comprising:
a front leg assembly pivotally mounted on the platform for pivoting with respect to the platform such that the front leg assembly is pivotable between a transport position and a lift position;
a rear leg assembly pivotally mounted on the platform for pivoting with respect to the platform such that the rear leg assembly is pivotable between a transport position and a lift position;
a linking structure linking the rear leg assembly to the front leg assembly for pivoting the rear leg assembly with the front leg assembly; and
moving means for moving the front leg assembly between the transport and lift positions; and ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface; and wherein the rear leg assembly includes a pair of rear legs, and the elevating system includes a roller mounted on each of the rear legs toward a bottom end of the rear leg, the roller being mounted on the rear leg in a manner such that the rear leg does not rest on the roller when the rear leg assembly is in the lift position, and the rear leg rolls on the roller as the rear leg assembly moves toward the lift position from the transport position.

21. The apparatus of claim 20 wherein the roller causes the rear of the platform to raise as the rear leg assembly moves from the lift position toward the transport position.

22. A portable lifting apparatus comprising:

a platform having a front and rear;

an elevating system mounted on the platform for elevating the platform above a ground surface with any vehicle positioned on the platform, the elevating system comprising:

a front leg assembly pivotally mounted on the platform for pivoting with respect to the platform such that the front leg assembly is pivotable between a transport position and a lift position;

a rear leg assembly pivotally mounted on the platform for pivoting with respect to the platform such that the rear leg assembly is pivotable between a transport position and a lift position;

a linking structure linking the rear leg assembly to the front leg assembly for pivoting the rear leg assembly with the front leg assembly; and moving means for moving the front leg assembly between the transport and lift positions; and ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface;

wherein the platform comprises a pair of channels for supporting wheels of a vehicle, the pair of channels extending between the front and rear of the platform and being laterally spaced to form a central space therebetween.

23. The apparatus of claim 22 additionally comprising a support tray assembly extending between the pair of channels across the central space between the channels, the support tray assembly being movable towards the front of the platform and toward the rear of the platform.

24. A portable lifting apparatus comprising:

a platform having a front and rear;

an elevating system mounted on the platform for elevating the platform above a ground surface with any vehicle positioned on the platform, the elevating system comprising:

a front leg assembly pivotally mounted on the platform for pivoting with respect to the platform such that the front leg assembly is pivotable between a transport position and a lift position;

a rear leg assembly pivotally mounted on the platform for pivoting with respect to the platform such that the rear leg assembly is pivotable between a transport position and a lift position;

a linking structure linking the rear leg assembly to the front leg assembly for pivoting the rear leg assembly with the front leg assembly; and moving means for moving the front leg assembly between the transport and lift positions;

ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface; and securing means for securing the front leg assembly in positions between the transport position and the lift position and resisting movement of the front leg assembly toward the transport position;

wherein the securing means comprises:

a securing member pivotally mounted on each of the front legs, each securing member extending rearwardly from one of the front legs and upwardly toward a bottom of the platform, the securing member having a free end being positionable adjacent to the bottom of the platform;

a securing ladder mounted on the bottom of the platform, the securing ladder having a pair of laterally spaced rail members and a plurality of rung members extending between the rail members, the rung members defining spaces therebetween for receiving the free end of the securing member;

biasing means for biasing the securing member upwardly toward the bottom of the platform and the free end of the securing member into engagement with the securing ladder; and a release structure for releasing the biasing means from acting on the securing member to move the free end of the securing member out of engagement with the securing ladder.

25. A portable lifting apparatus comprising:

a platform having a front and rear;

an elevating system mounted on the platform for elevating the platform above a ground surface with any vehicle positioned on the platform, the elevating system comprising:

a front leg assembly pivotally mounted on the platform for pivoting with respect to the platform such that the front leg assembly is pivotable between a transport position and a lift position;

a rear leg assembly pivotally mounted on the platform for pivoting with respect to the platform such that the rear leg assembly is pivotable between a transport position and a lift position;

a linking structure linking the rear leg assembly to the front leg assembly for pivoting the rear leg assembly with the front leg assembly; and moving means for moving the front leg assembly between the transport and lift positions;

ground engaging means for engaging the ground surface in a manner permitting the platform to move over the ground surface, the ground engaging means being mounted on the platform for elevating with the platform when the elevating system raises the platform and such that the ground engaging means are lifted from contact with the ground surface; and platform stabilization means for stabilizing the platform with respect to the ground surface when loading a vehicle onto the platform, the platform stabilization means being mounted on the platform toward the rear of the platform and being selectively abuttable against the ground surface for resisting downward movement of the rear of the platform.

26. The apparatus of claim 1 wherein the means for removably attaching the platform to a towing vehicle includes a trailer hitch.

* * * * *